(12) United States Patent
Sylvan et al.

(10) Patent No.: US 11,024,014 B2
(45) Date of Patent: Jun. 1, 2021

(54) SHARP TEXT RENDERING WITH REPROJECTION

(71) Applicant: Microsoft Technology Licensing, LLC, Redmond, WA (US)

(72) Inventors: Roger Sebastian Kevin Sylvan, Seattle, WA (US); Phillip Charles Heckinger, Duvall, WA (US); Arthur Tomlin, Kirkland, WA (US); Nikolai Michael Faaland, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 434 days.

(21) Appl. No.: 15/195,918

(22) Filed: Jun. 28, 2016

(65) Prior Publication Data
US 2017/0372457 A1   Dec. 28, 2017

(51) Int. Cl.
*G06T 5/00* (2006.01)
*G06F 3/01* (2006.01)
(Continued)

(52) U.S. Cl.
CPC ............ *G06T 5/003* (2013.01); *G02B 27/017* (2013.01); *G02B 27/0179* (2013.01); *G06F 1/163* (2013.01); *G06F 3/011* (2013.01); *G06F 3/012* (2013.01); *G06F 3/013* (2013.01); *G06F 3/048* (2013.01); *G06T 1/20* (2013.01); *G06T 11/001* (2013.01); *G06T 15/04* (2013.01);
(Continued)

(58) Field of Classification Search
None
See application file for complete search history.

(56) References Cited

U.S. PATENT DOCUMENTS

| 6,342,890 B1 | 1/2002 | Shetter |
| 7,483,042 B1 * | 1/2009 | Glen ........................ G09G 5/10 |
| | | 345/419 |

(Continued)

OTHER PUBLICATIONS

"International Search Report and Written Opinion Issued in PCT Application No. PCT/US2017/036938", dated Aug. 23, 2017, 13 Pages.
(Continued)

*Primary Examiner* — Christopher R Lamb
(74) *Attorney, Agent, or Firm* — Alleman Hall Creasman & Tuttle LLP

(57) ABSTRACT

A computing device is provided, which includes an input device, a display device, and a processor configured to, at a rendering stage of a rendering pipeline, render visual scene data to a frame buffer, and generate a signed distance field of edges of vector graphic data, and, at a reprojection stage of the rendering pipeline prior to displaying the rendered visual scene, receive post rendering user input via the input device that updates the user perspective, reproject the rendered visual scene data in the frame buffer based on the updated user perspective, reproject data of the signed distance field based on an updated user perspective, evaluate the signed distance field to generate reprojected vector graphic data, and generate a composite image including the reprojected rendered visual scene data and the reprojected graphic data, and display the composite image on the display device.

20 Claims, 9 Drawing Sheets

(51) Int. Cl.
   *G06F 1/16*    (2006.01)
   *G06T 15/20*   (2011.01)
   *G02B 27/01*   (2006.01)
   *G06F 3/048*   (2013.01)
   *G06T 1/20*    (2006.01)
   *G06T 11/00*   (2006.01)
   *G06T 15/04*   (2011.01)
   *G06T 19/00*   (2011.01)
   *G09G 5/28*    (2006.01)

(52) U.S. Cl.
   CPC ............ *G06T 15/20* (2013.01); *G06T 19/006* (2013.01); *G09G 5/28* (2013.01); *G02B 2027/0187* (2013.01); *G09G 2340/0407* (2013.01); *G09G 2360/18* (2013.01)

(56) References Cited

U.S. PATENT DOCUMENTS

| | | | |
|---|---|---|---|
| 8,553,032 B1 | 10/2013 | Poston | |
| 8,988,434 B1 | 3/2015 | Roth | |
| 9,020,272 B1 | 4/2015 | Esfahbod Mirhosseinzadeh Sarabi et al. | |
| 2004/0189666 A1* | 9/2004 | Frisken | G06T 11/001 345/611 |
| 2015/0187129 A1 | 7/2015 | Sloan | |
| 2015/0193018 A1 | 7/2015 | Venable et al. | |
| 2015/0310665 A1 | 10/2015 | Michail et al. | |
| 2016/0093105 A1* | 3/2016 | Rimon | G06T 19/006 345/633 |

OTHER PUBLICATIONS

Newcombe, et al., "KinectFusion: Real-time dense surface mapping and tracking", In 10th IEEE International Symposium on Mixed and Augmented reality (ISMAR), Oct. 26, 2011, pp. 127-136.

Erleben, et al., "Signed Distance Fields Using Single-Pass GPU Scan Conversion of Tetrahedra", Published on: Mar. 7, 2009 Available at: http://http.developer.nvidia.com/GPUGems3/gpugems3_ch34.html.

"Lambda Cube 3D", Published on: Feb. 13, 2016 Available at: https://lambdacube3d.wordpress.com/.

Dobbie, Will, "GPU text rendering with vector textures", Published on: Jan. 2, 2016 Available at: http://wdobbie.com/post/gpu-text-rendering-with-vector-textures/.

Green, Chris, "Improved Alpha-Tested Magnification for Vector Textures and Special Effects", In Proceedings of 34th International Conference and Exhibition on Computer Graphics and Interactive Techniques, Aug. 5, 2007, 5 pages.

"Office Action Issued in European Patent Application No. 17736799.2", dated Oct. 12, 2020, 10 Pages.

"Office Action Issued in European Patent Application No. 17736799.2", dated May 4, 2020, 4 Pages.

* cited by examiner

SHARP TEXT RENDERING WITH REPROJECTION

BACKGROUND

Real time rendering pipelines are used to render computer graphics in real time based on user inputs. In some applications, a lag may develop between the user inputs and the rendering of computer graphics, due to the time required to perform the rendering. To correct for this lag, an image may be reprojected after rendering, immediately before being displayed, based on a most recent reading of user input data.

SUMMARY

A computing device is provided, which includes an input device, a display device, and a processor. The processor is configured to, at a rendering stage of a rendering pipeline, determine based on data output by an application program a scene from a user perspective, the scene including visual scene data and vector graphic data, the user perspective determined based on user input from the input device, render the visual scene data as two dimensional pixel data to a frame buffer, and generate a signed distance field of edges of the vector graphic data. The processor is further configured to, at a reprojection stage of the rendering pipeline prior to displaying the rendered visual scene, receive post rendering user input via the input device that updates the user perspective, reproject the rendered visual scene data in the frame buffer based on the updated user perspective, reproject data of the signed distance field based on the updated user perspective, evaluate the signed distance field to generate reprojected vector graphic data, generate a composite image including the reprojected rendered visual scene data and the reprojected graphic data, and display the composite image on the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed in detail below, the inventors have recognized that the reprojection of images described in the background can result in blurred images, and that such blurring can have a particularly negative affect on users' perception of text and other vector graphics, since users are accustomed to viewing text and other vector graphics in sharp focus. The systems and methods described herein have been devised to address this challenge, and, as discussed below, offer the advantage of potentially reducing such blurring for text and other vector graphics, while still taking advantage of the accurate positioning offered by last stage reprojection.

Figure 1:
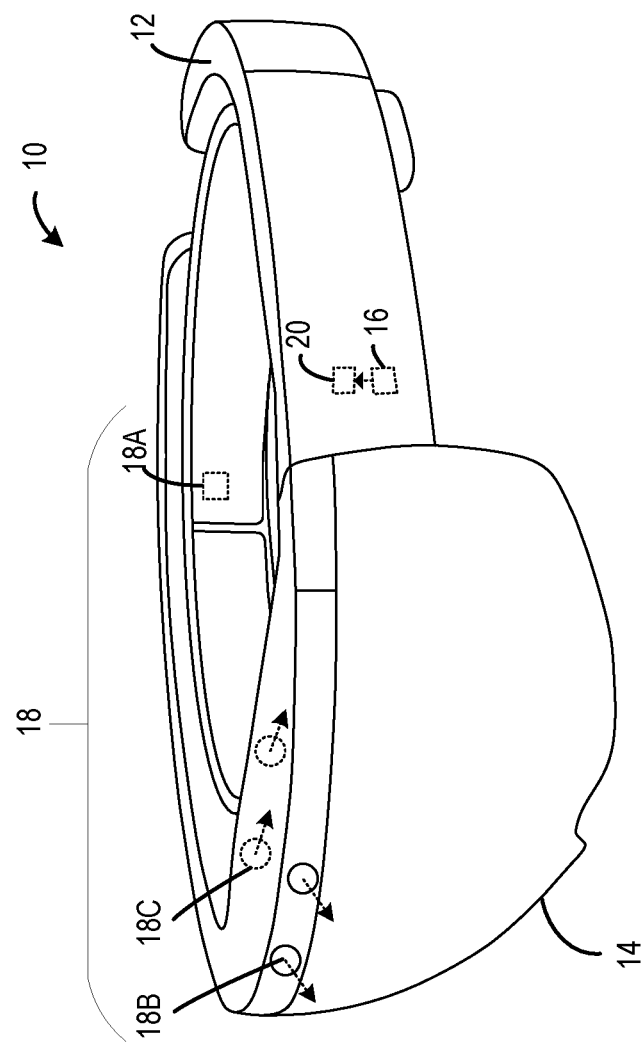
FIG. 1 shows a side perspective view of a computing device in the form of a head mounted display (HMD) device, according to one embodiment of the present disclosure.

FIG. 1 illustrates a computing device in the form of a head mounted display (HMD) device 10. The HMD device 10 may be worn by a user according to an example of the present disclosure. In other examples, an HMD device may take other suitable forms in which an at least partially see-through display is supported in front of a viewer's eye or eyes in an augmented reality HMD device configuration.

In the example of FIG. 1, the HMD device 10 includes a frame 12 that wraps around the head of the user to position a display device 14 close to the user's eyes. The frame supports additional components of the HMD device 10, such as, for example, a processor 16 and input devices 18. The processor 16 includes logic and associated computer memory configured to provide image signals to the display device 14, to receive sensory signals from input devices 18, and to enact various control processes described herein.

Any suitable display technology and configuration may be used to display images via the display device 14. For example, in a non-augmented reality configuration, the display device 14 may be a non-see-through Light-Emitting Diode (LED) display, a Liquid Crystal Display (LCD), or any other suitable type of non-see-through display. In an augmented reality configuration, the display device 14 may be configured to enable a wearer of the HMD device 10 to view a physical, real-world object in the physical environment through one or more partially transparent pixels displaying virtual object representations. For example, the display device 14 may include image-producing elements such as, for example, a see-through Organic Light-Emitting Diode (OLED) display.

As another example, the HMD device 10 may include a light modulator on an edge of the display device 14. In this example, the display device 14 may serve as a light guide for delivering light from the light modulator to the eyes of a wearer. In other examples, the display device 14 may utilize a liquid crystal on silicon (LCOS) display.

The input devices 18 may include various sensors and related systems to provide information to the processor 16. Such sensors may include, but are not limited to, an inertial measurement unit (IMU) 18A, one or more outward facing image sensors 18B, and one or more inward facing image sensors 18C. The one or more inward facing image sensors 18B may be configured to acquire image data in the form of gaze tracking data from a wearer's eyes.

The processor 16 may execute instructions to determine gaze directions of each of a wearer's eyes in any suitable manner based on the information received from the inward facing image sensors 18C. For example, one or more light sources, such as infrared light sources, may be configured to cause a glint of light to reflect from the cornea of each eye of a wearer. The one or more image sensors 18C may be configured to capture an image of the wearer's eyes. Images of the glints and of the pupils as determined from image data gathered from the image sensors may be used to determine an optical axis of each eye. Using this information, the processor 16 may execute instructions to determine a direction in which the wearer is gazing.

In other implementations, a different type of gaze sensor may be employed in the HMD device 10 to measure one or more gaze parameters of the user's eyes. Examples of gaze parameters measured by one or more gaze sensors may include an eye gaze direction or gaze vector, head orientation, eye gaze velocity, eye gaze acceleration, change in angle of eye gaze direction, and/or any other suitable tracking information.

The one or more outward facing image sensors 18B may be configured to capture and/or measure physical environment attributes of the physical environment in which the HMD device 100 is located. In one example, image sensor 116 may include a visible-light camera configured to collect a visible-light image of a physical space. Further, the one or more outward facing image sensors 18B may include a depth camera configured to collect a depth image of a physical space. More particularly, in one example the depth camera is an infrared time-of-flight depth camera. In another example, the depth camera is an infrared structured light depth camera.

Data from the outward facing image sensors 18B may be used by the processor 16 to generate and/or update a three-dimensional (3D) model of the physical space. Data from the outward facing image sensors 18B may be used by the processor 16 to identify surfaces of the physical space and/or measure one or more surface parameters of the physical space. The processor 16 may execute instructions to generate/update virtual scenes displayed on display device 14 and identify surfaces of the physical space in any suitable manner. In one example, depth maps derived from depth data provided by the depth camera of image sensor 18B may be used to accurately position and determined occlusion for virtual text displayed on the display device 14. It will be appreciated that in some non-augmented reality configurations of HMD device 10, that the input devices 18 may not include the outward facing image sensors 18B.

In augmented reality configurations of HMD device 10, the position and/or orientation of the HMD device 10 relative to the physical environment may be assessed so that augmented-reality images may be accurately displayed in desired real-world locations with desired orientations. As noted above, the processor 16 may execute instructions to generate a 3D model of the physical environment including surface reconstruction information that may be used to identify surfaces in the physical space.

In both augmented reality and non-augmented reality configurations of HMD device 10, the IMU 18A of HMD device 10 may be configured to provide position and/or orientation data of the HMD device 10 to the processor 16. In one implementation, the IMU 18A may be configured as a three-axis or three-degree of freedom (3DOF) position sensor system. This example position sensor system may, for example, include three gyroscopes to indicate or measure a change in orientation of the HMD device 10 within 3D space about three orthogonal axes (e.g., roll, pitch, and yaw). The orientation derived from the sensor signals of the IMU may be used to display, via the display device 14, one or more holographic images with a realistic and stable position and orientation.

In another example, the IMU 18A may be configured as a six-axis or six-degree of freedom (6DOF) position sensor system. Such a configuration may include three accelerometers and three gyroscopes to indicate or measure a change in location of the HMD device 10 along three orthogonal spatial axes (e.g., x, y, and z) and a change in device orientation about three orthogonal rotation axes (e.g., yaw, pitch, and roll). In some implementations, position and orientation data from the outward facing image sensors 18B and the IMU 18A may be used in conjunction to determine a position and orientation (or 6DOF pose) of the HMD device 10.

In some examples, a 6DOF position sensor system may be used to display holographic representations in a world-locked manner. A world-locked holographic representation appears to be fixed relative to one or more real world objects viewable through the HMD device 10, thereby enabling a wearer of the HMD device 10 to move around a real world physical environment while perceiving a world-locked hologram as remaining stationary in a fixed location and orientation relative to the one or more real world objects in the physical environment.

The processor 16 may include a logic processor and the HMD device 10 may include volatile memory and non-volatile storage, as discussed in more detail below with respect to the example computing system 900 of FIG. 8, in communication with the display device 14 and the various sensors of input devices 18.

The above descriptions relate to an HMD device implementation of the computing device. However, it will be appreciated that a non HMD device implementation, such as a desktop computing device, a tablet computing device, etc., may be configured to execute the methods described herein.

Figure 2:
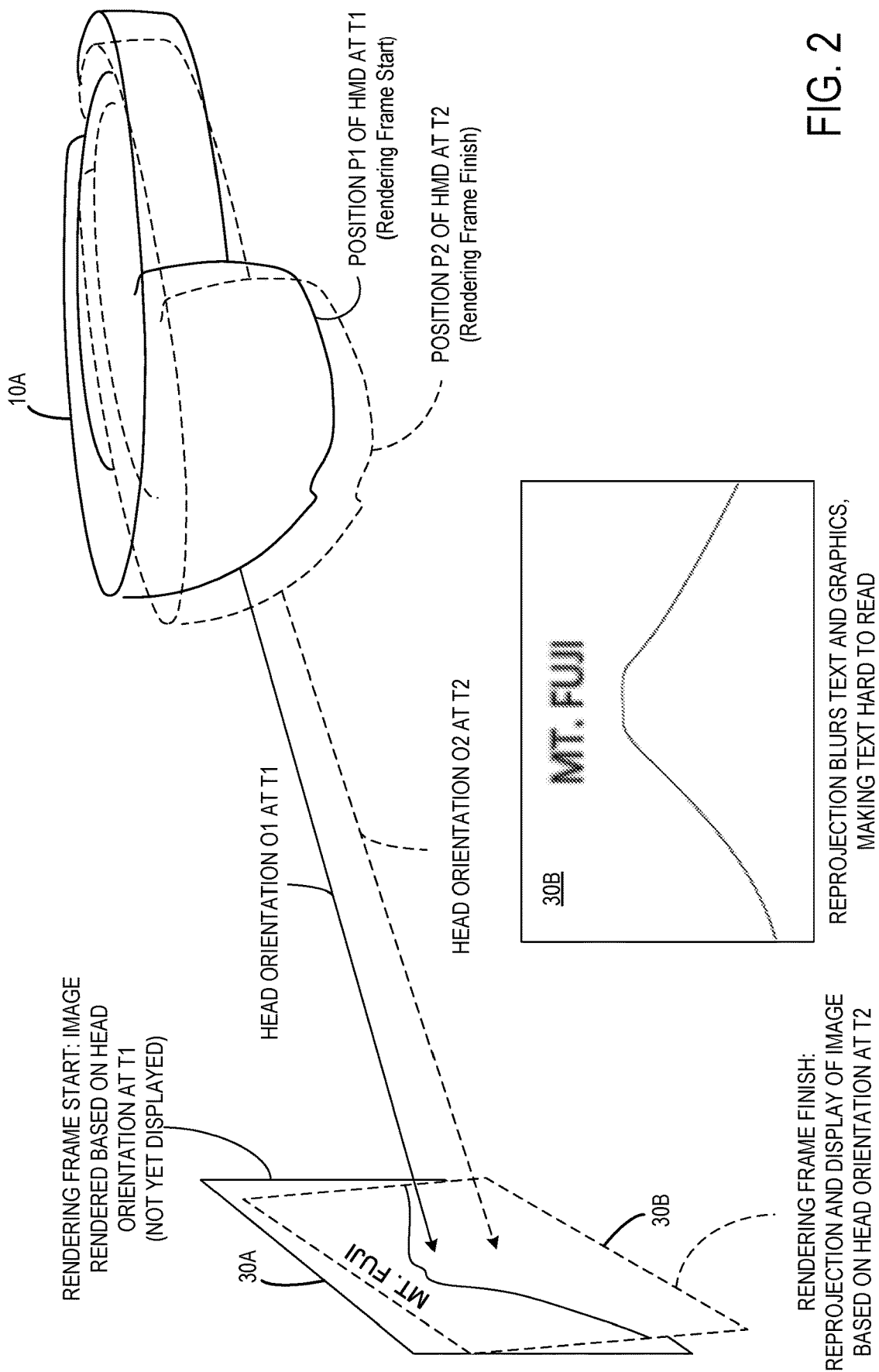
FIG. 2 shows a schematic view of post rendering reprojection of a rendered frame, to correct for changes in position and orientation of the HMD device of FIG. 1, and blurriness that can result.

FIG. 2 illustrates an example of a blurred text issue that may arise after reprojection of a rendered image, as discussed previously. As shown, an example HMD device 10A worn by user has begun rendering an image 30A at a time T1. The image 30A is rendered based on application data of an application being executed on the example HMD device 10A, which may include, in the illustrated example, a virtual representation of Mt. Fuji. Thus, the virtual representation of Mt. Fuji is rendered from a user perspective, which may be defined at least in part by a position P1 of the example HMD device 10A and a head orientation O1 of the user at the time T1. In addition to the virtual representation of Mt. Fuji, the text data for the name "MT. FUJI" is also rendered into the image. Accordingly, the image 30A, including both a virtual representation of Mt. Fuji and the words "Mt. Fuji" as viewed from the user perspective, are rendered to a frame buffer and thus stored in volatile memory of the example HMD device 10.

However, it will be appreciated that rendering the image 30A will take a discrete amount of time. Furthermore, in some implementations, the image 30A may be rendered by a separate computing device, such as a desktop computer, before being sent to the example HMD device 10A to be displayed, which may further increase the amount of time that passes between when the rendering of the image 30A has begun and when the image 30A would actually be displayed to the user. Thus, at time T2, when the image 30A has finally been rendered and is ready to be displayed on a display of the example HMD device 10A, a discrete amount of time has already passed, such as 10-20 milliseconds, which may be enough time for the user to move or continue to move their head to a different head orientation and thus alter the position of the HMD device 10A. Accordingly, at time T2, the example HMD device 10A may have the position P2 and user may have the head orientation O2, which are different from the position P1 and head orientation O1 of the time T1 when the image 30A was being rendered. Consequently, the image 30A will have been rendered from a user perspective for head orientation O1, while the user will be expecting to see an image rendered from user perspective for head orientation O2. This discrepancy may cause disorientation for the user, and may degrade the user experience.

To address the above issue, the example HMD device 10A is configured to reproject the image data for the rendered image 30A to the user perspective for head orientation O2 and example HMD device 10A position P2. Reprojecting the image data may be processed more quickly than fully rendering a new image, and the image 30A may be reprojected to the new orientation O2 and displayed to the user before enough time has passed for the user's head orientation to further change by any impactful degree. Accordingly, at time T2, the reprojected image 30B is displayed to the user on the example HMD device 10A. However, as the reprojected image 30B was generated from the image data for image 30A rather than being rendered, the reprojection process may cause the text and graphics of image 30B to become perceivably blurry to the user, as illustrated in FIG. 2. Blurriness and lack of sharpness in text is particularly perceivable by users since they are used seeing sharp text, and thus may potentially significantly degrade user experience.

Figure 3:
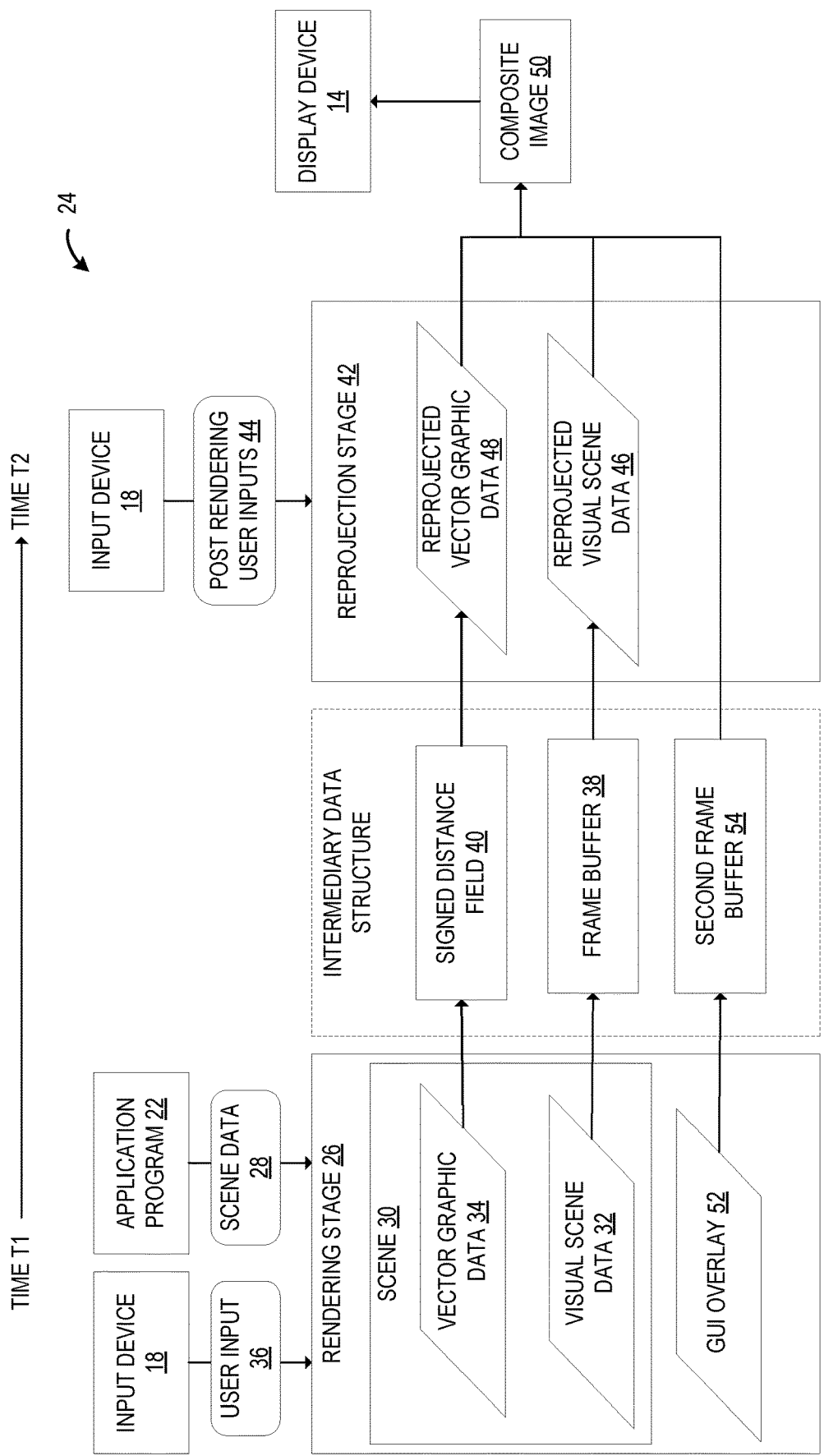
FIG. 3 shows a schematic view of one embodiment of a rendering pipeline implemented by the HMD device of FIG. 1.

Now turning to FIG. 3, to address the issues discussed above, an HMD device 10 according to one embodiment of the present description may be configured to render a visual scene of an application program 22 executed on the HMD device 10 via a rendering pipeline 24. In the illustrated embodiment, at a rendering stage 26 of the rendering pipeline 24, the processor 16 of HMD device 10 is configured to determine based on data 28 output by an application program 22 a scene 30 from a user perspective, the scene 30 including visual scene data 32 and vector graphic data 34, the user perspective determined based on user input 36 from the input device 18. Within the application program 22, the scene 30 may be represented as either two or three dimensional depending on the type of graphics being employed by the application program. Through the process of rendering, a view of the scene from a camera angle oriented along the user perspective is rasterized as two dimensional pixel data to a frame buffer. However, it will be appreciated that the pixel data may be associated with three dimensional data, such as depth data for each pixel, which may be utilized for reprojection of the pixel data to a new perspective. The data 28 output by the application program 22 may include, for example, virtual world data, position data for virtual objects in the virtual world, meshes for virtual objects, color data for virtual objects, and any other suitable data that may be used to render the scene 30.

The scene 30 includes visual scene data 32, which may, for example, include image data for virtual objects, a background, environmental effects, etc., in the virtual world that can be seen from the user perspective. It will be appreciated that the visual scene data 32 of scene 30 is typically represented as pixel data. Thus, during the rendering stage 26, it will be appreciated that a vector graphics representation of the output is converted by a rasterization process into pixel data for display as the visual scene data 32 of the scene 30. The scene 30 also includes vector graphic data 34 that is not rasterized into pixel data, and which, for example, may include text data, icon data, vector shapes, etc., that in the virtual world can be seen from the user perspective. In the illustrated example, the scene 30 may include visual scene data, which is pixel data, for the virtual representation of Mt. Fuji described in FIG. 2. The scene 30 may further include unrasterized vector graphic data such as text data, which in this specific example may be the text "Mt. Fuji" displayed to the user.

The user perspective may be determined according to a stream of user inputs from input device 18. At a time T1, the user perspective is most recently determined based on the user input 36 received from the input device 18 at time T1.

As shown, at the rendering stage 26 of the rendering pipeline 24, the processor 16 of HMD device 10 is configured to render the visual scene data 32 to a frame buffer 38 as pixel data, and thus the visual scene data 32 is stored in the frame buffer 38 in the volatile memory of the HMD device 10. This frame buffer may also be cached in non-volatile memory, depending on needs. To address the blurriness with the HMD device 10A as described in FIG. 2, the processor 16 of HMD 10 is configured to process the vector graphic data 34 in a separate layer than the visual scene data 32. Thus, separate from the visual scene data 32 rendered to the frame buffer 38 as pixel data, the processor 16 is configured to generate a signed distance field 40 of edges of the vector graphic data 34. Typically, the size (in two or three dimensions) of the visual scene data 32 rendered, rasterized and stored in frame buffer 38 is the same as the size of the signed distance field 40 representing the vector graphic data 34.

Figure 4:
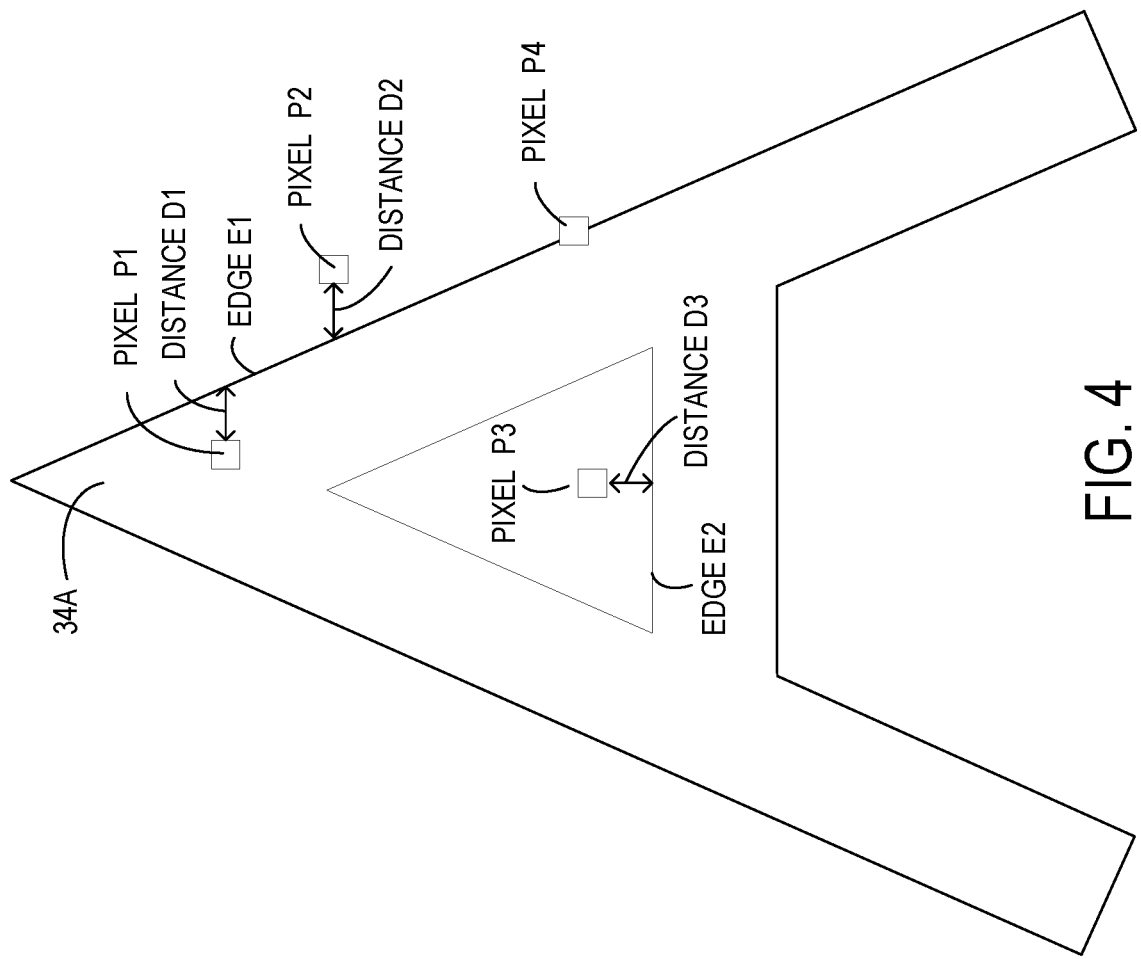
FIG. 4 is a schematic illustration of a signed distance field representation of vector graphic data in the form of text data, displayed on the HMD device of FIG. 1.

Now turning to FIG. 4, the signed distance field 40 of edges of the vector graphic data 34 includes an entry for each pixel in the scene 30 in a full-screen resolution implementation. However, it will be appreciated that a half-screen, quarter-screen, or other resolution of signed distance fields may also be used to achieve a suitable memory requirement of the HMD device 10. In one embodiment, a value of each pixel in the signed distance field 40 represents a distance to a nearest edge of a vector graphic in the vector graphic data 34. In another alternative embodiment, more than one distance may be stored; for example, a plurality of values may be stored in each pixel in the signed distance field representing distances to each of a plurality of edges in the vicinity of the vector graphic in the vector graphic data. This alternative approach can be used in situations where the resolution of the signed distance field is lower than the frame, to more accurately reconstruct regions of intricate detail. FIG. 4 illustrates an example vector graphic 34A, which is text data for the letter "A" in this specific example. For each pixel in the signed distance field 40, which analytically represents a grid of pixels encompassing the entire vector graphic 34A, a value of each of those pixels represents a distance to a nearest edge of the example vector graphic 34A. The distance may be calculated in units of pixels. For example, the nearest edge to example pixel P1 is the edge E1 of the example vector graphic 34A. Thus, the value in the signed distance field 40 for the pixel P1 is the distance D1 from the nearest edge E1, which, for example, may be a distance of 2 pixels. Additionally, the distance may have a sign (i.e. negative – for inside, or positive + for outside, and 0 for on an edge) to indicate whether the pixel is inside the vector graphic or outside of the vector graphic.

In this particular example, the pixel P1 is inside of the example vector graphic 34A (The letter "A"), and thus has a distance value of −2 pixels. It will be appreciated that other methods of denoting whether a particular pixel is inside or outside of the vector graphic may also be utilized. For example, a positive value may indicate that the pixel is inside while a negative value may indicate that the pixel is outside the vector graphic. Alternatively, the values may be normalized to 0 to 1 scale, with values of 0 to 0.5 indicating that the pixel is inside the vector graphic and values of 0.5 to 1 indicating that the pixel is outside the vector graphic, and a value of exactly 0.5 indicating that the pixel is on an edge of the vector graphic.

Similarly, the nearest edge to example pixel P2 is also the edge E1 of the example vector graphic 34A. Thus, the value in the signed distance field 40 for the pixel P2 is the distance D2 from the nearest edge E1, which, for example, may also be a distance of 2 pixels. However, in this example, the pixel P2 is outside of the example vector graphic 34A, and thus has a distance value of +2 (or just "2") pixels.

Further in this example, the nearest edge to example pixel P3 is the edge E2 of the example vector graphic 34A. Additionally, it will be appreciated that while the example pixel P3 is surrounded by the example vector graphic 34A, is actually inside the example vector graphic 34, but is outside of the portions of example vector graphic 34A that would be rendered. Thus, the value in the signed distance field 40 for the pixel P3 is the distance D3 with a positive value, which, in this example, may be a value of +1. Lastly in this example, the nearest edge to example pixel P4 is the edge E1 of the example vector graphic 34A. In fact, as shown, the example pixel P4 lies on the edge E1. Thus, the value in the signed distance field 40 for the pixel P4 is 0. It will be appreciated that the method discussed above may be applied to every pixel in the signed distance field. Additionally, it will be appreciated that the vector graphic data 34 may include more than one vector graphic. For example, the vector graphic data 34 may include a string of text, for example, "Mt. Fuji". Thus, the nearest edge for one pixel may be an edge of the vector graphic "M" while the nearest edge for another pixel may be an edge of the vector graphic "F".

Figure 5:
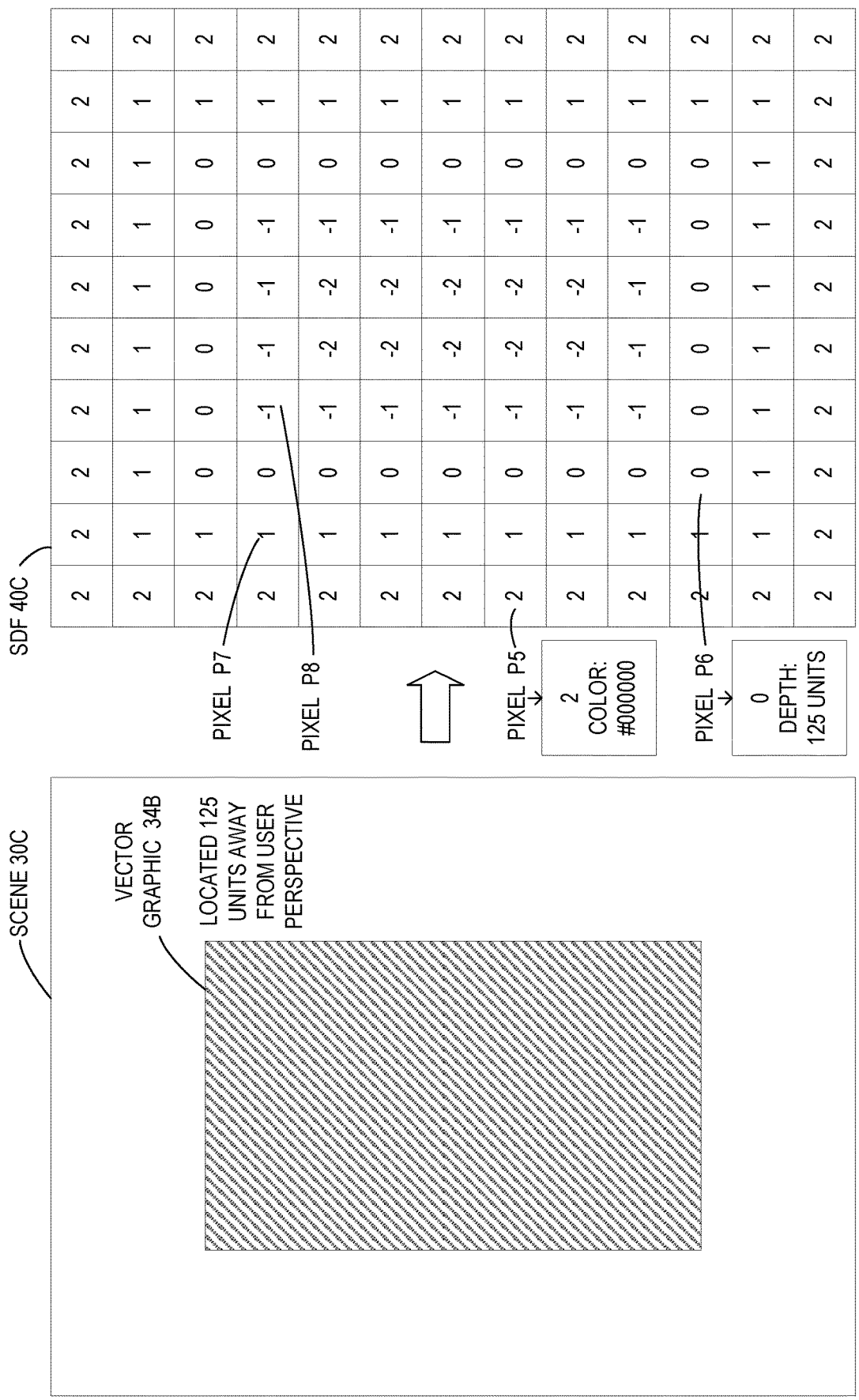
FIG. 5 is a schematic illustration a signed distance field representation of a vector graphic data in the form of a geometric shape, displayed on the HMD device of FIG. 1.

FIG. 5 illustrates another example vector graphic 34B included in an example scene 30C. As shown, rather than text data, the example vector graphic 34B is a solid square icon. In this example, the vector graphic 34B is located at a position in the example scene 30C that is 125 units away from the user perspective, which may be a virtual camera in the virtual world for scene 30C representing the user's position and gaze direction. Accordingly, at the rendering stage 26 of the rendering pipeline 24, an example signed distance field 40C for the vector graphic data including example vector graphic 34B of example scene 30C is generated. As shown, each pixel of scene 30C has a corresponding value in the example signed distance field 40C representing the distance to the nearest edge of the example vector graphic 34B. Thus, pixels that lie on an edge of the example vector graphic 34B have a value in the example signed distance field 40C of 0, and pixels that lie at a distance 1 pixel away from a nearest edge have a value of −1 or +1 depending on whether the pixel is inside or outside the example vector graphic 34B.

As illustrated in FIG. 5, each pixel in the signed distance field 40 may further include a color or texture value. As shown, the example pixel P5 has a position that is outside the example vector graphic 34B and is 2 pixels away from the nearest edge. Thus, the example pixel P5 has a value in the example signed distance field 40C of 2. However, each entry in the example signed distance field 40C further includes a color value of the nearest edge for that pixel. Thus, as shown, the example pixel P5 has a color value in hexadecimal of #000000 (Black) for the nearest edge of the example vector graphic 34B. It will be appreciated that values other than hexadecimal values may be utilized to store the color value of the nearest edge. Although only example pixel P5 is shown as including a color value for the nearest edge, it will be appreciated that each pixel in the example signed distance field 40C may include a color value. It will be appreciated that texture values may treated in the same manner as color values.

Further in the illustrated example of FIG. 5, each pixel in the signed distance field 40 further includes a depth value for that pixel in the scene 30. As shown, the example pixel P6 has a position that is on an edge of the example vector graphic 34B, and thus has a value in the example signed distance field 40C of 0. Additionally, in this specific example, as the example vector graphic 34B is located at a position that is 125 units away from the user perspective, the pixel P6 may be given a depth value that is the same as the example vector graphic 34B. Thus, the example pixel P6 further include a depth value of 125 units in the example signed distance field 40. It will be appreciated that the units for the depth value may be determined based on the internal measuring system of the virtual world of the application being executed on the HMD device, such as, for example, inches, meters, feet, pixels, etc. Although only example pixel P6 is shown as including a depth value in the example signed distance field 40C, it will be appreciated that each pixel in the example signed distance field 40C may include a depth value.

The processor 16 of the HMD device 10 may be configured to evaluate the signed distance field 40 to generate the vector graphic data that was analytically represented in the signed distance field 40. In the example illustrated in FIG. 5, the example signed distance field 40C may be evaluated to generate a visual graphic for the example vector graphic 34B of the example scene 30C. To evaluate the example signed distance field 40C, the processor 16 may be configured to threshold the value of each pixel in the example signed distance field 40C. For example, if the threshold value is 0.5, then the processor 16 may be configured to evaluate each pixel in the example signed distance field 40C having a value more positive than 0.5 as being a pixel outside any vector graphic including example vector graphic 34B.

On the other hand, each pixel in the example signed distance field 40C having a value more negative than −0.5 is evaluated as being a pixel inside a vector graphic such as example vector graphic 34B. Lastly, each pixel in the example signed distance field 40C having a value that is in-between the values of −0.5 to 0.5 may be evaluated as being a pixel on an edge of a vector graphic. Next, according to the above evaluation, all pixels evaluated as outside a vector graphic may be either not rendered or set to be transparent, all pixels evaluated as inside a vector graphic may be rendered to a suitable color, and all pixel evaluated as being on an edge of a vector graphic may similarly be rendered to a suitable color which, for example, may be the same color as the pixels inside the vector graphic. Thus, in this manner, the signed distance field 40 may be quickly evaluated to generate the vector graphic data 34. It will be appreciated that any suitable thresholding value may be used to evaluate the data of the signed distance field 40, such as 0.1, 0.2, etc.

Further, as the signed distance field 40C is an analytical representation of the vector graphic data that comprises discrete mathematical values, it will be appreciated that the data of the signed distance field 40C may be efficiently sampled and interpolated. For example, to reproject data of the signed distance field 40, the processor 16 may be configured to execute a filtered sample of the signed distance field 40 and interpolate appropriate values for each pixel for new user perspectives. As a specific example, the example pixel P7 has a value in the example signed distance field 40C of 1, and the example pixel P8 has a value of −1. Thus, during filtered sampling of the example signed distance field 40C, the processor 16 may interpolate between example pixel P7 and example pixel P8 to determine a value for any point between those two example pixels. For example, a point half way between example pixels P7 and P8 would have a value of 0, and thus be a point on the edge of the vector graphic. A point a quarter of distance from example pixel P7 to example pixel P8 would have a value of 0.5. Thus, it will be appreciated that the signed distance field 40 may be sampled at any arbitrary position and a valid distance value for a pixel at that position may be determined based on the surrounding values in the signed distance field 40.

Turning back to FIG. 3, as discussed above, the visual scene data 32 is rendered to the frame buffer 38, and the vector graphic data 34 is analytically represented in the signed distance field 40. As shown, at a reprojection stage 42 of the rendering pipeline 24 prior to displaying the rendered visual scene, the processor 16 is further configured to receive post rendering user input 44 via the input device 18 that updates the user perspective. The post rendering user input 44 may be received at a time between the time T1 when rendering of the scene 30 has begun, and the time T2 when the rendered scene is to be displayed on the display device 14. For example, in an HMD device 10 configuration, the user may have moved their head during the time period between T1 and T2 while the scene 30 was being rendered. Thus, in this specific example, the post rendering user inputs 44 may be head movements of the user detected by the input device 18 of the HMD device 10, such as the IMU 18A. However, it will be appreciated that other types of post rendering user inputs 44 may be input, such as inputs to a game controller or other control device, voice inputs, gaze direction inputs, etc. After receiving the post rendering user input 44, the processor 16 updates the user perspective within the virtual world of application program 22.

As discussed previously, a discrepancy between the updated user perspective and the initial user perspective from which the scene 30 was rendered, may cause disorientation for the user and generally degrade user experience. To address this issue, the processor 16 of the HMD device 10 is configured to reproject the rendered visual scene data 32 in the frame buffer 38 based on the updated user perspective. It will be appreciated that the frame buffer 38 includes rendered visual scene data 32, but not rendered vector graphic data 34. Thus, the rendered visual scene data 32 is reprojected to the updated user perspective to generate reprojected visual scene data 46.

In parallel to the reprojection of the rendered visual scene data 32, the processor 16 is configured to reproject data of the signed distance field 40 based on the updated user perspective. As discussed previously, the data of the signed distance field 40 is an analytical representation of the vector graphic data 34, and to reproject data of the signed distance field 40, the processor 16 may be configured to perform filtered sampling of the signed distance field 40 to determine a value for each pixel in the reprojected image. In a specific example, the processor 16 may be configured to cast rays from the updated user perspective to positions in the signed distance field 40, and sample the signed distance field 40 at each of those positions. A value for a distance to the nearest edge may then be determined from the signed distance field 40 for each of those positions. As discussed above, even if a sampled position lies between pixels represented by the signed distance field 40, a correct distance value may be interpolated based on the stored values for those nearby pixels in the signed distance field 40.

Next, the processor 16 is configured to evaluate reprojected data of the signed distance field 40 to generate reprojected vector graphic data 48. In one example, the signed distance field 40 may be evaluated according to the thresholding method discussed previously in regards to FIG. 5. Thus, by evaluating the reprojected data of the signed distance field 40, visual data for the reprojected vector graphic data 48 with sharp edges may be efficiently generated. It will be appreciated that the process for evaluating the signed distance field 40 takes less computational resources than would be consumed by fully rerastering the vector graphic data from the updated user perspective, and thus can be accomplished even within a fraction of a frame. In examples where the data of the signed distance field 40 includes color data for the nearest edge, the processor 16 may be further configured to generate the reprojected vector graphic data 48 according to the color data. For example, by drawing the nearest edge of the vector graphic to be the color represented by the color data for that pixel in the signed distance field 40. When interpolating values for positions between pixels in the signed distance field 40, the color or texture value may be copied or interpolated from the nearby pixels.

Next, as shown in FIG. 3, the processor 16 of the HMD device 10 is configured to generate a composite image 50 including the reprojected rendered visual scene data 46, rendered as pixels, and the reprojected vector graphic data 48, also rendered as pixels in the composite image 50. The composite image 50 may be generated by overlaying the reprojected vector graphic data over the reprojected rendered visual scene data 46. In one example, the reprojected vector graphic data includes depth values that can be associated with each pixel in the rendered version of the vector graphic data. In this example, the visual scene data 32 may also be rendered to include depth data for each pixel in the visual scene. Thus, to generate the composite image 50, the processor 16 may be configured to determine which pixels of the reprojected vector graphic data 48 are occluded, such as by having a larger depth, by pixels of the reprojected visual scene data at the same locations, and further configured to not display occluded pixels of the reprojected vector graphic data 48. Next, the processor 16 is further configured to display the composite image 50 on the display device 14.

Figure 6:
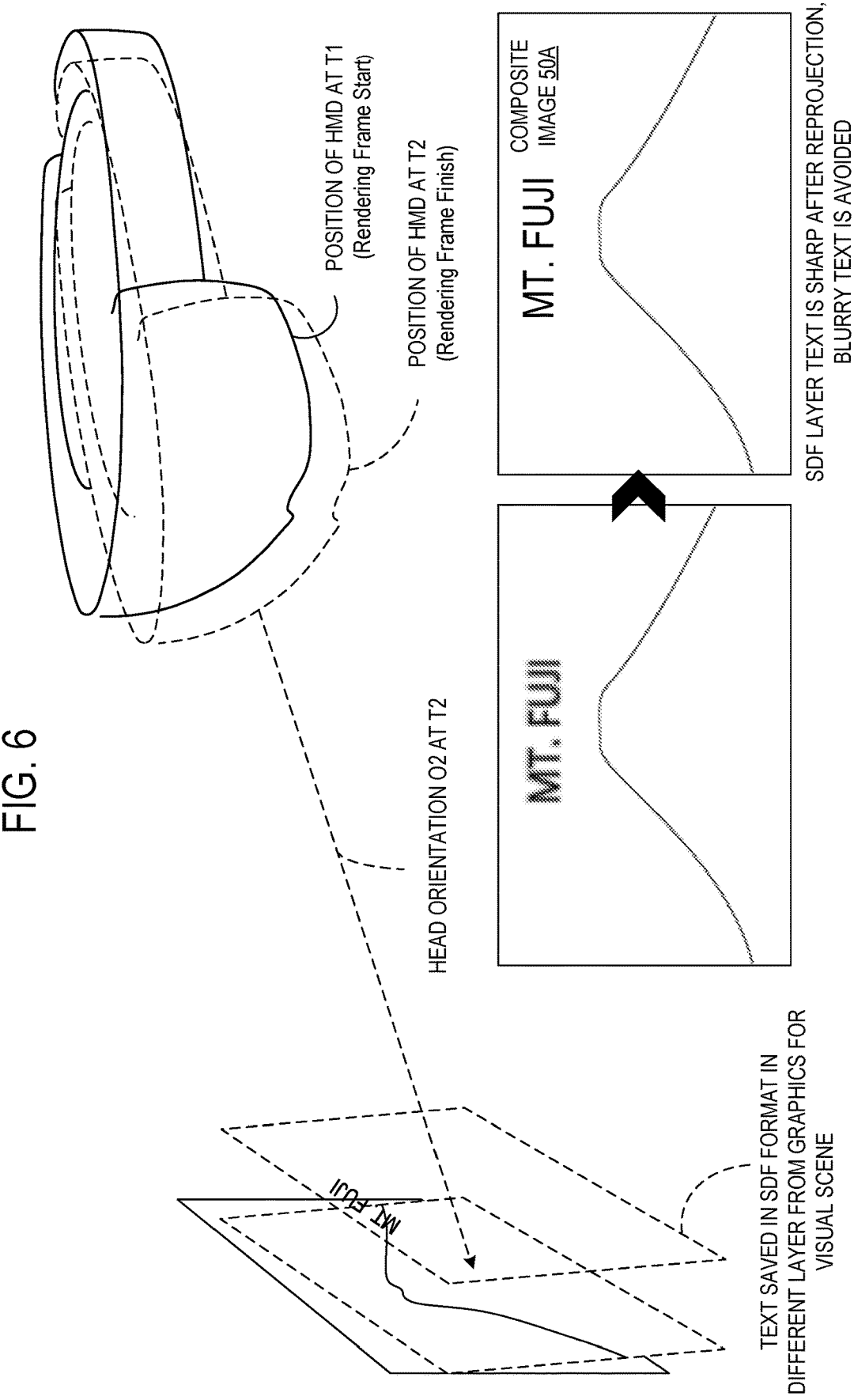
FIG. 6 shows a schematic view of post rendering reprojection of a composite frame that has two layers, one with visual scene data (pixel data) and one with vector graphics data such as text data, to avoid blurriness in the vector graphics data in the displayed composite image.

Turning to FIG. 6, an example of the composite image 50 is shown. As illustrated, the visual scene data 32 and the vector graphic data 34 are generated in two different layers in the rendering pipeline 24. The visual scene data 32 is rendered and stored in a frame buffer 38 while the vector graphic data 34 is analytically represented in a signed distance field 40. In the example of FIG. 6, the visual scene data and the vector graphic data are reprojected to an updated user perspective for head orientation O2, and composited by the processor 16 into the example composite image 50A, which is displayed on the display device 14 of the HMD device 10. By processing the visual data and vector graphic data in separate rendering layers according to the methods discussed above, the vector graphic data, "MT.

FUJI" in this specific example, may be reprojected to the updated user perspective without becoming blurry.

In the illustrated embodiment of FIG. 3, at the rendering stage 26 of the rendering pipeline 24, the processor 16 is further configured to generate a graphical user interface overlay 52 that is locked to a viewport of the display device 14. For example, the graphical user interface overlay 52 may be a head up display that presents suitable information to the user. In this example, the head up display is locked to the viewport of the display device 14, and thus moves with the orientation of the user's head. As shown in FIG. 3, the graphical user interface overlay 52 is locked to the viewport of the display device 14, and thus does not need to be reprojected during the reprojection stage 42. Accordingly, the graphical user interface overlay 52 may be rendered to a second frame buffer 54. In this embodiment, the processor 16 is further configured to generate the composite image 50 including the reprojected rendered visual scene data 46, the reprojected vector graphic data 48, and the graphical user interface overlay 52. For example, the graphical user interface overlay 52 may be composited on top of the visual data for both the reprojected vector graphic data 48 and the reprojected visual scene data 46.

Turning back briefly to FIG. 1, the HMD device 10 may further include a dedicated processing device 20 separate from the processor 16. In this embodiment, the reprojection stage 42 of the rendering pipeline 24 is executed on the dedicated processing device 20 separate from the rendering stage 26 of the rendering pipeline 24. For example, the dedicated processing device 20 may include hardware configured to efficiently reproject visual data and evaluate signed distance fields, such as a graphics processing unit. However, it will be appreciated that the dedicated processing device 20 may take other forms, such as a field programmable gate array, an application-specific integrated circuit, a system-on-chip, or another type of suitable integrated circuit.

Figure 7:
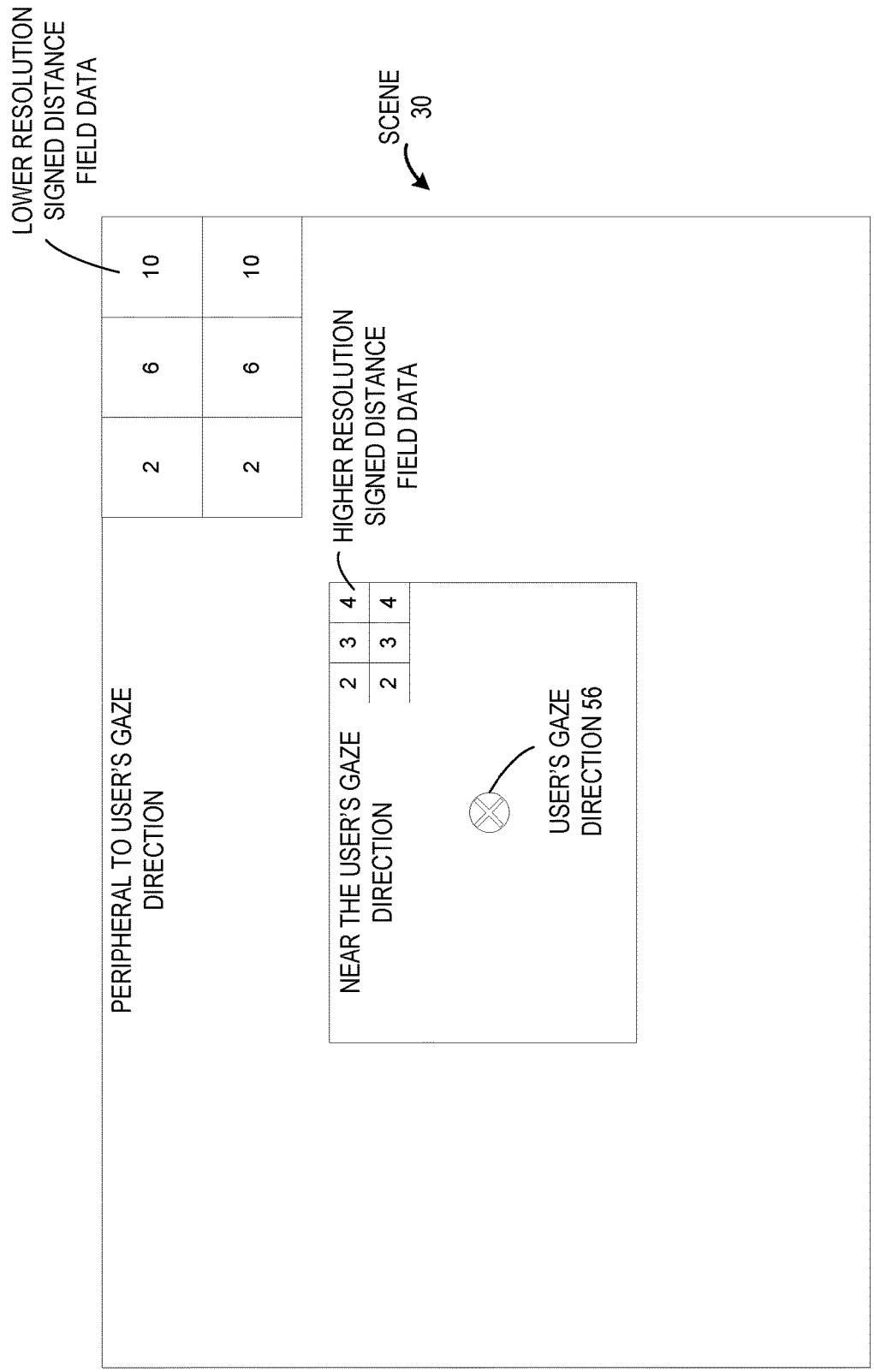
FIG. 7 shows a schematic illustration of a foveated rendering using signed distance fields, implemented by the HMD device of FIG. 1.

Now turning to FIG. 7, an example of foveated rendering with signed distance fields is illustrated. In this example, the inward facing image sensors 18C of the HMD device 10 are configured to track a user's gaze direction. The processor 16 is configured to receive data for the user's gaze direction, and at the rendering stage 26 of the rendering pipeline 24, generate the signed distance field 40 to include a higher resolution of signed distance field data for vector graphic data 34 near the user's gaze direction 56 than a resolution of signed distance field data for vector graphic data 34 peripheral to the user's gaze direction 56. As shown in FIG. 7, signed distance field data near the user's gaze direction 56 is generated at a higher resolution than the signed distance field data peripheral to the user's gaze direction 56. For example, the signed distance field data for peripheral vector graphics may have the same number of values as the signed distance field data for nearby graphics, but cover a larger area of the scene 30. As shown in FIG. 7, each stored value in the lower resolution signed distance field data covers a large range of the scene 30. To generate lower resolution signed distance field data, the processor 16 may be configured to determine and store values for positions in the scene with a larger spacing than the higher resolution signed distance field data. For example, the lower resolution signed distance field data may be determined for every $4^{th}$ pixel in the peripheral to user's gaze direction area of the scene 30, while the higher resolution signed distance field data is determined for every pixel in the near the user's gaze direction area of the scene 30A. As another example, the lower resolution signed distance field data may be a quarter screen signed distance field, while the higher resolution signed distance field data may be a full screen signed distance field. However, it will be appreciated that any suitable resolutions for the higher and lower resolutions may be chosen based on resource consumption targets. Additionally, it will be appreciated that both the higher and lower resolution signed field data may be reprojected and evaluated according to the same methods.

Figure 8:
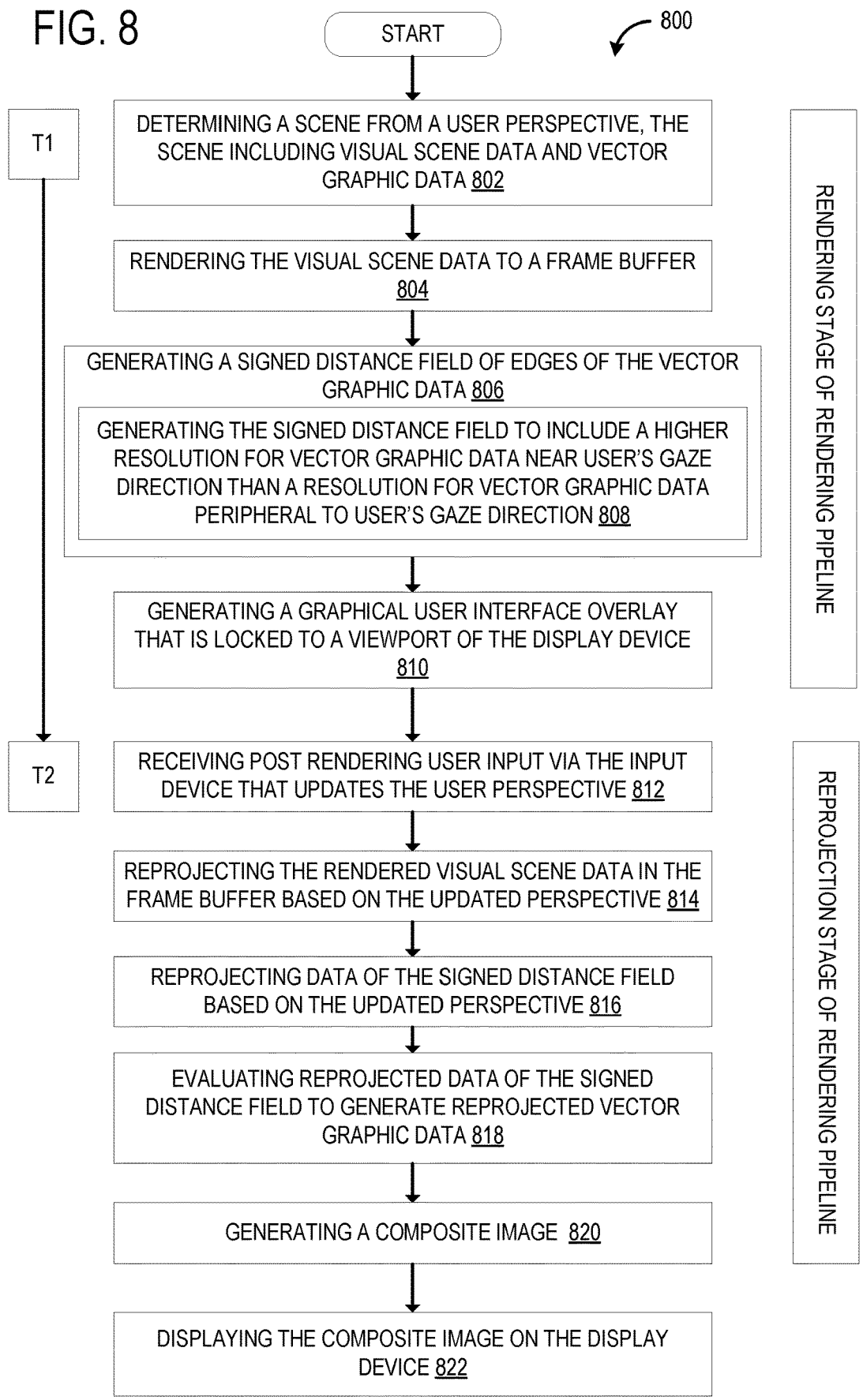
FIG. 8 shows an example method for sharp text rendering using the HMD device of FIG. 1.

FIG. 8 shows an example computer-implemented method 800 according to an embodiment of the present description. At step 802, the method 800 may include, at a rendering stage of a rendering pipeline, determining based on data output by an application program a scene from a user perspective, the scene including visual scene data and vector graphic data, the user perspective determined based on user input from an input device. For example, the application program may be executed on a computing device, such as an HMD device, and may include a virtual world with virtual objects and backgrounds. The user perspective may be represented by a virtual camera within the world of the application program, the virtual camera being movable according to user input from input devices of the computing device. In the HMD device embodiment, the input device includes sensors configured to detect head movement of a user of the head mounted display device, such as various sensors to track the user's head position and orientation, and adjust the user perspective in the virtual world of the application program accordingly. Thus, a scene or view of the virtual world of the application program from the user perspective is determined, including any virtual objects and vector graphics that can be seen from that user perspective. Accordingly, visual scene data, which, for example, may include virtual objects and backgrounds, is determined. Similarly, vector graphic data, which, for example, may include text data or icon data is also determined.

Advancing from step 802 to step 804, the method 800 may include rendering the visual scene data as two dimensional pixel data to a frame buffer. The visual scene data may be rendered through any suitable rendering method. However, it will be appreciated that the visual scene data is rendered in a separate layer from the vector graphic data layer.

At step 806, in parallel or sequentially to step 804, the method 800 may include generating a signed distance field of edges of the vector graphic data. The signed distance field is a data structure holding values for each pixel, or a suitable resolution of pixels, of the scene. In one example, a value of each pixel in the signed distance field represents a distance to a nearest edge of a vector graphic in the vector graphic data, or a plurality of values are stored in each pixel in the signed distance field representing distances to each of a plurality of edges in the vicinity of the vector graphic in the vector graphic data. Each vector graphic in the vector graphic data may comprise multiple edges. Thus, a distance of each pixel to a nearest edge of the vector graphics in the vector graphic data is determined. The distance value for each pixel is then stored in the signed distance field. Further in this example, each pixel in the signed distance field further includes a color or texture value. The color or texture value may be a hexadecimal value, or another suitable type of value that may define a color spectrum or texture. Further in this example, each pixel in the signed distance field further includes a depth value for that pixel in the scene. The depth value may be a distance from the user perspective to the location in the virtual world of the vector graphic in which the pixel is located. Pixels outside of the vector graphics may be given a default value to indicate that those pixels have no depth.

In one example, step 806 includes substep 808. At substep 808, the method 800 may include generating the signed distance field to include a higher resolution of signed distance field data for vector graphic data near the user's gaze direction than a resolution of signed distance field data for vector graphic data peripheral to the user's gaze direction. In an HMD device embodiment, the head mounted display includes an inward facing image sensor configured to track a user's gaze direction. In one example, vector graphic within an area around the user's gaze direction that is 30% of the viewport of the display device may be considered near the user's gaze direction. On the other hand, vector graphics outside that area may be considered peripheral to the user's gaze direction. However, it will be appreciated that other ratios may be utilized, such as 20% or 40% as a few non-limiting examples. In one example, a high resolution signed distance field may be a full screen signed distance field, and a low resolution distance field may be a quarter screen signed distance field. However, it will be appreciated that any suitable resolutions may be used to meet resource consumption needs. The different resolution signed distance fields may be evaluated and reprojected according to the same methods.

Advancing to step 810, the method 800 may include generating a graphical user interface overlay that is locked to a viewport of the display device. The graphical user interface overlay is locked to a viewport of the display device rather than world locked, and thus moves with the orientation of the HMD device or user perspective. Thus, the graphical user interface overlay does not depend upon a change user perspective, and does not require reprojection.

Proceeding to step 812, at a reprojection stage of the rendering pipeline prior to displaying the rendered visual scene, receiving post rendering user input via the input device that updates the user perspective. The post rendering user input may be received via the input device at any time between the point in time T1 and the point in time T2. As shown in FIG. 8, the point in time T1 is when rendering of the visual scene has begun, and the point in time T2 is immediately before the rendered scene is to be displayed on the display device. The time elapsed between T1 and T2 may, for example, be 10-30 ms. Thus, within that time period, the user may enter additional post rendering user input, such as the user moving their head to a new position and orientation. Consequently, the user's head position and orientation at time T2 may be different than at time T1 when the scene was rendered, and the discrepancy may cause disorientation for the user if the visual scene is not reprojected to the updated user perspective.

Advancing from step 812 to step 814, the method 800 may include reprojecting the rendered visual scene data in the frame buffer based on the updated perspective. Reprojecting the rendered visual scene data does not require the scene to be rerendered, and consumes less processing time than rendering. Thus, the visual scene data may be reprojected to the updated perspective and displayed to the user before additional user inputs may be entered to the input device.

Proceeding from step 814 to step 816, the method 800 may include reprojecting data of the signed distance field based on the updated perspective. In one specific example, reprojecting data of the signed distance field based on the updated perspective includes performing a filtered sampling of the signed distance field. For example, if a particular pixel for the updated perspective has a position that is in between two pixels represented by the signed distance field, then the value for that particular pixel may be interpolated from the values of the two pixels of the signed distance field. Thus, if the two signed distance field pixels have a value of 1 and 2, and the particular pixel for the updated perspective has a position that is exactly halfway between the two signed distance field pixels, then the value for that particular pixel may be interpolated as 1.5. In this manner, a value for every pixel for the updated perspective may be interpolated to generate reprojected data of the signed distance field.

Advancing from step 816 to step 818, the method 800 may include evaluating reprojected data of the signed distance field to generate reprojected vector graphic data. This may be accomplished at least in part by thresholding the reprojected data of the signed distance field. In one specific example, a negative value indicates that a pixel is inside a vector graphic, while a positive value indicates that a pixel is outside of a vector graphic, and the numerical value indicates how far away that pixel is from a nearest edge of a vector graphic. Thus, if a thresholding value is 0.5, then all pixels with reprojected data having a value more negative than −0.5 is determined to be inside a vector graphic and colored accordingly. All pixels with reprojected data having a value more positive than 0.5 are determined to be outside a vector graphic and made transparent accordingly. And all pixels with reprojected data having a value between −0.5 and 0.5 are determined to be an edge of a vector graphic, and colored accordingly. In this manner, the reprojected data of the signed distance field may efficiently be evaluated to generate reprojected vector graphic data that may be displayed to the user.

Proceeding from step 818 to step 820, the method 800 may include generating a composite image including the reprojected rendered visual scene data and the reprojected vector graphic data. In one example, during the rendering stage, a graphical user interface overlay was generated. In this example, at step 820, the method 800 may include generating the composite image including the reprojected rendered visual scene data, the reprojected vector graphic data, and the graphical user interface overlay. Generating the composite image overlaying each layer, including the visual data layer, the vector graphic layer, and the graphical user interface overlay on top of one another. In one example, the signed distance field includes depth values for each pixel represented by the signed distance field. Thus, in this example, any reprojected data of the signed distance field having a depth value that is behind a corresponding pixel of the reprojected rendered visual scene data may be determined to be occluded and consequently not rendered in the composite image. The graphical user interface overlay may be composited as the top most layer.

Advancing from step 820 to step 822, the method 800 may include displaying the composite image on the display device. The display device may be an at least partially see-through display in an augmented reality configuration, or a non-see-through display in a non-augmented reality HMD device configuration. However, it will be appreciated that other display devices may also be used to display the composite image, such as a desktop display device in a desktop computing configuration.

In one example, the computer-implemented method is executed on an HMD device. In this example, the reprojection stage of the rendering pipeline is executed on a dedicated processing device separate from the rendering stage of the rendering pipeline. For example, the dedicated processing device may include hardware configured to efficiently reproject visual data and evaluate signed distance fields, such as a graphics processing unit. However, it will be appreciated that the dedicated processing device may take other forms, such as a field programmable gate array, an application-specific integrated circuit, a system-on-chip, or another type of suitable integrated circuit.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
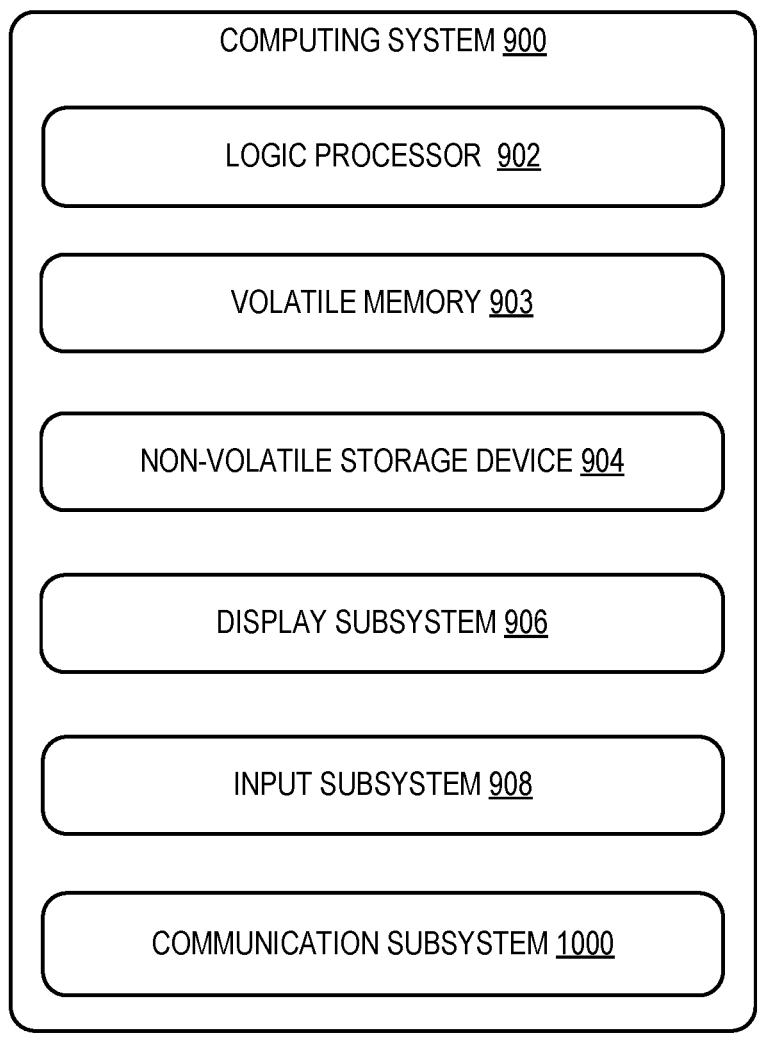
FIG. 9 shows an example computing system according to an embodiment of the present description.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, microphone, camera, or game controller.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a computing device, comprising an input device, a display device, and a processor configured to, at a rendering stage of a rendering pipeline, determine based on data output by an application program a scene from a user perspective, the scene including visual scene data and vector graphic data, the user perspective determined based on user input from the input device, render the visual scene data as two dimensional pixel data to a frame buffer, and generate a signed distance field of edges of the vector graphic data, at a reprojection stage of the rendering pipeline prior to displaying the rendered visual scene, receive post rendering user input via the input device that updates the user perspective, reproject the rendered visual scene data in the frame buffer based on the updated user perspective, reproject data of the signed distance field based on the updated user perspective, evaluate reprojected data of the signed distance field to generate reprojected vector graphic data, generate a composite image including the reprojected rendered visual scene data and the reprojected graphic data, and display the composite image on the display device. In this aspect, additionally or alternatively, a value of each pixel in the signed distance field may represent a distance to a nearest edge of a vector graphic in the vector graphic data, or wherein a plurality of values may be stored in each pixel in the signed distance field representing distances to each of a plurality of edges in the vicinity of the vector graphic in the vector graphic data. In this aspect, additionally or alternatively, each pixel in the signed distance field may further include a color or texture value. In this aspect, additionally or alternatively, each pixel in the signed distance field may further include a depth value for that pixel in the scene. In this aspect, additionally or alternatively, the vector graphic data may be text data. In this aspect, additionally or alternatively, the processor may be further configured to generate a graphical user interface overlay that is locked to a viewport of the display device, and generate the composite image including the reprojected rendered visual scene data, the reprojected vector graphic data, and the graphical user interface overlay. In this aspect, additionally or alternatively, the reprojection stage of the rendering pipeline may be executed on a dedicated processing device separate from the rendering stage of the rendering pipeline. In this aspect, additionally or alternatively, the computing device may be a head mounted display device, and the input device may include sensors configured to detect head movement of a user of the head mounted display device. In this aspect, additionally or alternatively, the head mounted display may include an inward facing image sensor configured to track a user's gaze direction, and the processor may be further configured to generate the signed distance field to include a higher resolution of signed distance field data for vector graphic data near the user's gaze direction than a resolution of signed distance field data for vector graphic data peripheral to the user's gaze direction.

Another aspect provides a computer-implemented method, comprising, at a rendering stage of a rendering pipeline, determining based on data output by an application program a scene from a user perspective, the scene including visual scene data and vector graphic data, the user perspective determined based on user input from an input device, rendering the visual scene data as two dimensional data to a frame buffer, and generating a signed distance field of edges of the vector graphic data, at a reprojection stage of the rendering pipeline prior to displaying the rendered visual scene, receiving post rendering user input via the input device that updates the user perspective, reprojecting the rendered visual scene data in the frame buffer based on the updated perspective, reprojecting data of the signed distance field based on the updated perspective, evaluating reprojected data of the signed distance field to generate reprojected vector graphic data, generating a composite image including the reprojected rendered visual scene data and the reprojected vector graphic data, and displaying the composite image on the display device. In this aspect, additionally or alternatively, a value of each pixel in the signed distance field may represent a distance to a nearest edge of a vector graphic in the vector graphic data, or wherein a plurality of values may be stored in each pixel in the signed distance field representing distances to each of a plurality of edges in the vicinity of the vector graphic in the vector graphic data. In this aspect, additionally or alternatively, each pixel in the signed distance field may further include a color or texture value. In this aspect, additionally or alternatively, each pixel in the signed distance field may further include a depth value for that pixel in the scene. In this aspect, additionally or alternatively, the vector graphic data may be text data. In this aspect, additionally or alternatively, the method may further comprise generating a graphical user interface overlay that is locked to a viewport of the display device, and generating the composite image including the reprojected rendered visual scene data, the reprojected vector graphic data, and the graphical user interface overlay. In this aspect, additionally or alternatively, the reprojection stage of the rendering pipeline may be executed on a dedicated processing device separate from the rendering stage of the rendering pipeline. In this aspect, additionally or alternatively, the method may be implemented on a head mounted display device, and the input device may include sensors configured to detect head movement of a user of the head mounted display device. In this aspect, additionally or alternatively, the head mounted display may include an inward facing image sensor configured to track a user's gaze direction, and the method may further comprise generating the signed distance field to include a higher resolution of signed distance field data for vector graphic data near the user's gaze direction than a resolution of signed distance field data for vector graphic data peripheral to the user's gaze direction.

Another aspect provides a computer-implemented method comprising, in a rendering pipeline, determining a user perspective based on input data from an input device at a first moment in time, rendering a composite image for display including a first layer with two dimensional pixel data representing a scene and a second layer with vector graphics data, the second layer being encoded in signed distance field, based on the user perspective, prior to displaying the rendered composite image, determining an updated user perspective based on updated user input data from the user input device, reprojecting the rendered pixel data and the text data encoded in the signed distance field format based on the updated perspective, evaluating reprojected data of the signed distance field to generate reprojected vector graphic data, generating a updated composite image including the reprojected rendered pixel data and the reprojected graphic data, and displaying the updated composite image on a display device. In this aspect, additionally or alternatively, the display device may be a head mounted display device that may include an at least partially see through display on which the updated composite image may be displayed, and the input device may include one or more sensors that sense position and orientation of the head mounted display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
an input device;
a display device; and
a processor configured to:
at a rendering stage of a rendering pipeline:
determine based on data output by an application program a three dimensional scene from an initial user perspective, the three dimensional scene including visual scene data and vector graphic data having locations in the three dimensional scene, the initial user perspective determined based on user input from the input device;
render an initial view of the visual scene data from the initial user perspective in the three dimensional scene as two dimensional pixel data to a frame buffer; and
generate an initial view of the vector graphic data from the initial user perspective in the three dimensional scene as a signed distance field of edges;
at a reprojection stage of the rendering pipeline prior to displaying the rendered initial view of the visual scene data and the generated initial view of the vector graphic data:
receive post rendering user input via the input device that updates the user perspective from the initial user perspective to an updated user perspective that differs from the initial user perspective by a change in orientation with respect to the locations in the three dimensional scene about one or more orthogonal rotation axes, the post rendering user input indicating the change in orientation as detected by one or more sensors;
after the initial view of the visual scene data has been rendered and after the initial view of the vector graphic data has been generated for the three dimensional scene has been rendered from the initial user perspective, generate an updated view of the visual scene data and an updated view of the vector graphic data from the updated user perspective without rendering the three dimensional scene from the updated user perspective by separately performing a first reprojection process on the two dimensional pixel data and a second reprojection process on the signed distance field of edges, each reprojection process based on the post rendering user input indicating the change in orientation as detected by the one or more sensors;
generate a composite image of the three dimensional scene from the updated user perspective including the updated view of the visual scene data and the updated view of the vector graphic data;
display the composite image on the display device; wherein
the first reprojection process includes reprojecting the two dimensional pixel data in the frame buffer from the initial user perspective to the updated user perspective; and wherein
the second reprojection process includes sampling and evaluating the signed distance field of edges generated for the initial user perspective based on the updated user perspective.

2. The computing device of claim 1, wherein a value of each pixel in the signed distance field represents a distance to a nearest edge of a vector graphic in the vector graphic data, or wherein a plurality of values are stored in each pixel in the signed distance field representing distances to each of a plurality of edges in a vicinity of the vector graphic in the vector graphic data.

3. The computing device of claim 2, wherein each pixel in the signed distance field further includes a color or texture value.

4. The computing device of claim 2, wherein each pixel in the signed distance field further includes a depth value for that pixel in the scene.

5. The computing device of claim 1, wherein the vector graphic data is text data.

6. The computing device of claim 1, wherein the processor is further configured to:
generate a graphical user interface overlay that is locked to a viewport of the display device; and
generate the composite image including the updated view of the visual scene data, the updated view of the vector graphic data, and the graphical user interface overlay.

7. The computing device of claim 1, wherein the reprojection stage of the rendering pipeline is executed on a dedicated processing device separate from the rendering stage of the rendering pipeline.

8. The computing device of claim 1, wherein the computing device is a head mounted display device, and the input device includes the one or more sensors configured to detect head movement of a user of the head mounted display device.

9. The computing device of claim 8, wherein the head mounted display includes an inward facing image sensor configured to track a user's gaze direction, and the processor is further configured to:
generate the signed distance field to include a higher resolution of signed distance field data for vector graphic data near the user's gaze direction than a resolution of signed distance field data for vector graphic data peripheral to the user's gaze direction.

10. A computer-implemented method, comprising:
at a rendering stage of a rendering pipeline:
determining based on data output by an application program a three dimensional scene from an initial user perspective, the three dimensional scene including visual scene data and vector graphic data having locations in the three dimensional scene, the initial user perspective determined based on user input from an input device;

rendering an initial view of the visual scene data from the initial user perspective in the three dimensional scene as two dimensional pixel data to a frame buffer; and generating an initial view of the vector graphic data from the initial user perspective in the three dimensional scene as a signed distance field of edges;

at a reprojection stage of the rendering pipeline prior to displaying the rendered initial view of the visual scene data and the generated initial view of the vector graphic data:

receiving post rendering user input via the input device that updates the user perspective from the initial user perspective to an updated user perspective that differs from the initial user perspective by a change in orientation with respect to the locations in the three dimensional scene about one or more orthogonal rotation axes, the post rendering user input indicating the change in orientation as detected by one or more sensors;

after the initial view of the visual scene data has been rendered and after the initial view of the vector graphic data has been generated for the three dimensional scene from the initial user perspective, generating an updated view of the visual scene data and an updated view of the vector graphic data from the updated user perspective without rendering the three dimensional scene from the updated user perspective by separately performing a first reprojection process on the two dimensional pixel data and a second reprojection process on the signed distance field of edges, each reprojection process based on the post rendering user input indicating the change in orientation as detected by the one or more sensors;

generating a composite image of the three dimensional scene from the updated user perspective including the updated view of the visual scene data and the updated view of the vector graphic data;

displaying the composite image on a display device; wherein the first reprojection process includes reprojecting the two dimensional pixel data in the frame buffer from the initial user perspective to the updated user perspective; and wherein the second reprojection process includes sampling and evaluating the signed distance field of edges generated for the initial user perspective based on the updated user perspective.

11. The method of claim 10, wherein a value of each pixel in the signed distance field represents a distance to a nearest edge of a vector graphic in the vector graphic data, or wherein a plurality of values are stored in each pixel in the signed distance field representing distances to each of a plurality of edges in a vicinity of the vector graphic in the vector graphic data.

12. The method of claim 11, wherein each pixel in the signed distance field further includes a color or texture value.

13. The method of claim 11, wherein each pixel in the signed distance field further includes a depth value for that pixel in the scene.

14. The method of claim 10, wherein the vector graphic data is text data.

15. The method of claim 10, further comprising:
generating a graphical user interface overlay that is locked to a viewport of the display device; and generating the composite image including the updated view of the visual scene data, the updated view of the vector graphic data, and the graphical user interface overlay.

16. The method of claim 10, wherein the reprojection stage of the rendering pipeline is executed on a dedicated processing device separate from the rendering stage of the rendering pipeline.

17. The method of claim 10, wherein the method is implemented on a head mounted display device, and the input device includes the one or more sensors configured to detect head movement of a user of the head mounted display device.

18. The method of claim 17, wherein the head mounted display includes an inward facing image sensor configured to track a user's gaze direction, and the method further comprises:
generating the signed distance field to include a higher resolution of signed distance field data for vector graphic data near the user's gaze direction than a resolution of signed distance field data for vector graphic data peripheral to the user's gaze direction.

19. A computer-implemented method, comprising:
in a rendering pipeline
determining an initial user perspective based on user input data from a user input device at a first moment in time;

rendering a composite image for display including a first layer with two dimensional pixel data representing a three dimensional scene and a second layer with vector graphics data at one or more locations within the three dimensional scene, the second layer being encoded in a signed distance field, based on the initial user perspective;

prior to displaying the rendered composite image, determining based on updated user input data, an updated user perspective that updates the user perspective from the initial user perspective to the updated user perspective that differs from the initial user perspective by a change in orientation with respect to the locations in the three dimensional scene about one or more orthogonal rotation axes, the updated user input indicating the change in orientation as detected by one or more sensors of the user input device;

after the composite image has been rendered, generating an updated view of the three dimensional scene and an updated view of the vector graphics data for the updated user perspective without rendering the three dimensional scene from the updated user perspective by separately performing a first reprojection process on the two dimensional pixel data in the first layer and a second reprojection process on the signed distance field in the second layer, each reprojection process based on the post rendering user input indicating the change in orientation as detected by the one or more sensors;

generating an updated composite image including the updated view of the three dimensional scene and the updated view of the vector graphics data;

displaying the updated composite image on a display device; wherein the first reprojection process includes reprojecting the two dimensional pixel data in a frame buffer from the initial user perspective to the updated user perspective; and wherein the second reprojection process includes sampling and evaluating the signed distance field of edges generated for the initial user perspective based on the updated user perspective.

20. The method of claim 19, wherein the display device is a head mounted display device that includes an at least partially see through display on which the updated composite image is displayed, and the user input device includes the one or more sensors that sense position and orientation of the head mounted display device.

* * * * *